United States Patent
Choi et al.

(10) Patent No.: US 11,098,160 B2
(45) Date of Patent: Aug. 24, 2021

(54) POLYIMIDE-BASED BLOCK COPOLYMERS AND POLYIMIDE-BASED FILM COMPRISING THE SAME

(71) Applicant: LG CHEM, LTD., Seoul (KR)

(72) Inventors: Sung Yeol Choi, Daejeon (KR); Byung Guk Kim, Daejeon (KR); Sang Gon Kim, Daejeon (KR); Duk Hun Jang, Daejeon (KR); Hyung Sam Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 20 days.

(21) Appl. No.: 15/769,847

(22) PCT Filed: Oct. 12, 2017

(86) PCT No.: PCT/KR2017/011254
§ 371 (c)(1),
(2) Date: Apr. 20, 2018

(87) PCT Pub. No.: WO2018/080056
PCT Pub. Date: May 3, 2018

(65) Prior Publication Data
US 2020/0239634 A1    Jul. 30, 2020

(30) Foreign Application Priority Data

Oct. 24, 2016  (KR) .......................... 10-2016-0138565
Oct. 11, 2017  (KR) .......................... 10-2017-0129640

(51) Int. Cl.
*C08G 73/10*    (2006.01)
*C08J 5/18*     (2006.01)

(52) U.S. Cl.
CPC ...... *C08G 73/1003* (2013.01); *C08G 73/1067* (2013.01); *C08J 5/18* (2013.01); *C08J 2379/08* (2013.01)

(58) Field of Classification Search
None
See application file for complete search history.

(56) References Cited

U.S. PATENT DOCUMENTS 5,773,559 A    6/1998  Miyamoto et al.
8,962,890 B1   2/2015  Tan et al.
(Continued)

FOREIGN PATENT DOCUMENTS

CN    105461924 A    4/2016
JP    11-140186 A    5/1999
(Continued)

OTHER PUBLICATIONS

Odian etal (Principles of Polymerization, Copyright © 1991. pp. 19-23 and 141-149. John Wiley & Sons, Inc.; EBSCO Publishing: eBook Collection (EBSCOhost)—printed on Sep. 28, 2020). (Year: 1991).*

(Continued)

*Primary Examiner* — Rachel Kahn
(74) *Attorney, Agent, or Firm* — Rothwell, Figg, Ernst & Manbeck, P.C.

(57) ABSTRACT

The present disclosure relates to a polyimide-based block copolymer and a polyimide-based film including the same. The polyimide-based block copolymer according to the present disclosure makes it possible to provide a polyimide-based film having a large molecular weight and exhibiting colorless and transparent properties.

11 Claims, 3 Drawing Sheets

(56) References Cited

U.S. PATENT DOCUMENTS

| | | | |
|---|---|---|---|
| 9,012,595 | B2 | 4/2015 | Kim et al. |
| 9,085,661 | B1 | 7/2015 | Tan et al. |
| 9,139,696 | B1 | 9/2015 | Tan et al. |
| 9,434,832 | B1 | 9/2016 | Meador |
| 2003/0064235 | A1 | 4/2003 | Okawa et al. |
| 2010/0228002 | A1 | 9/2010 | Sohn et al. |
| 2012/0329958 | A1 | 12/2012 | Freeman et al. |
| 2015/0225523 | A1 | 8/2015 | Suenaga et al. |
| 2016/0009862 | A1 | 1/2016 | Jeon et al. |

FOREIGN PATENT DOCUMENTS

| | | | |
|---|---|---|---|
| JP | 3521589 | B2 | 4/2004 |
| JP | 2006-131706 | A | 5/2006 |
| JP | 2014-024004 | A | 2/2014 |
| JP | 2014024004 | A * | 2/2014 |
| JP | 2014-210896 | A | 11/2014 |
| KR | 10-0414314 | B1 | 6/2004 |
| KR | 10-0688912 | B1 | 2/2007 |
| KR | 10-2011-0007588 | A | 1/2011 |
| KR | 10-2011-0010009 | A | 1/2011 |
| KR | 10-2013-0078307 | A | 7/2013 |
| KR | 10-2014-0073277 | A | 6/2014 |
| KR | 10-1524195 | B1 | 5/2015 |
| KR | 10-2016-0007427 | A | 1/2016 |
| KR | 10-2016-0059097 | A | 5/2016 |
| KR | 20160059097 | A * | 5/2016 |
| WO | 2002-012926 | A1 | 2/2002 |
| WO | 2014-051050 | A1 | 4/2014 |

OTHER PUBLICATIONS

Liu et al., "Synthesis of soluble and autophotosensitive hyperbranched polyimides with good optical properties and thermal properties", Polymer Journal, 2013, vol. 45, pp. 318-325.

PCT Search Report & Written Opinion issue for International Application No. PCT/KR2017/011254 dated Jan. 22, 2018 (11 pages).

European Search Report for European Patent Application No. 17857646.8 dated Nov. 19, 2018, 8 pages.

Meador et al., "Polyimide Aerogels with Amide Cross-Links: A Low Cost Alternative for Mechanically Strong Polymer Aerogels," ACS Applied Materials & Interfaces, vol. 7, No. 2, Jan. 7, 2015, pp. 1240-1249.

* cited by examiner

POLYIMIDE-BASED BLOCK COPOLYMERS AND POLYIMIDE-BASED FILM COMPRISING THE SAME

CROSS-REFERENCE TO RELATED APPLICATION

This application is a 35 U.S.C. 371 National Phase Entry Application from PCT/KR2017/011254, filed Oct. 12, 2017, which claims the benefits of Korean Patent Application No. 10-2016-0138565 on Oct. 24, 2016 and Korean Patent Application No. 10-2017-0129640 on Oct. 11, 2017 with the Korean Intellectual Property Office, the disclosures of which are herein incorporated by reference in their entirety.

TECHNICAL FIELD

The present disclosure relates to a polyimide-based block copolymer and a polyimide-based film including the same.

BACKGROUND OF ART

The aromatic polyimide resin is a polymer mostly having an amorphous structure, and exhibits excellent heat resistance, chemical resistance, electrical properties, and dimensional stability due to its rigid chain structure. The polyimide resin is widely used as an electric/electronic material.

However, the polyimide resin has many limitations in use, because it is dark brown due to the formation of a CTC (charge transfer complex) of π electrons present in the imide chain.

In order to solve the limitations and obtain a colorless transparent polyimide resin, a method of restricting the movement of the π electrons by introducing a strong electron attracting group such as a trifluoromethyl (—CF$_3$) group, a method of reducing the formation of the CTC by introducing a sulfone (—SO$_2$—) group, an ether (—O—) group, or the like into the main chain to make a bent structure, or a method of inhibiting the formation of the resonance structure of the π electrons by introducing an aliphatic cyclic compound, have been proposed.

However, it is difficult for the polyimide resin according to the proposals to exhibit sufficient heat resistance due to the bending structure or the aliphatic cyclic compound, and a film prepared using the same still has limitations such as poor mechanical properties and a high yellow index.

DETAILED DESCRIPTION OF THE INVENTION

Technical Problem

The present disclosure is to provide a polyimide-based block copolymer exhibiting colorless and transparent properties.

The present disclosure is also to provide a polyimide-based film including the same.

Technical Solution

The present disclosure provides a polyimide-based block copolymer including.

a first repeating unit represented by Chemical Formula 1, and a second repeating unit represented by Chemical Formula 2:

[Chemical Formula 1]

[Chemical Formula 2]

wherein, in Chemical Formulae 1 and 2, $L^1$ and $L^2$ are the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O) NH—, or a C6 to C30 divalent aromatic organic group;

$R^1$ and $R^2$ are independently —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3;

$Ar^1$ and $Ar^2$ are the same as or different from each other in each repeating unit, and each is independently a C6 to C30 divalent aromatic organic group, wherein at least one of $Ar^1$ and $Ar^2$ includes a C6 to C30 divalent aromatic organic group substituted with at least one of an acetate group (CH$_3$COO—) and a hydroxyl group (HO—), and the divalent aromatic organic group exists alone, or two or more aromatic organic groups are bonded to each other to form a condensed ring, or two or more aromatic organic groups are linked by a single bond, —O—, —S—, —C(=O)—, —CH (OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^1$ to $E^4$ are independently a single bond, —NH—, or —C(=O)—; and each $Z^1$ is the same as or different from each other in each repeating unit, and each is independently a trivalent linking group derived from at least one compound selected from the group consisting of triacyl halide, triamine, and tricarboxylic acid.

The present disclosure also provides a polyimide-based film including the polyimide-based block copolymer.

Hereinafter, the polyimide-based block copolymer and the polyimide-based film including the same according to the exemplary embodiments of the present disclosure will be described in more detail.

Prior to that, terms are used merely to refer to specific embodiments, and are not intended to restrict the present disclosure unless it is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

Also, terms including ordinal numbers such as "first" and "second" are used to distinguish one component from another, and the components are not limited by the ordinal number. For example, within the scope of the present invention, a first component may also be referred to as a second component, and similarly, a second component may be referred to as a first component.

Further, the symbol "*" in chemical formulas of the present disclosure represents a part at which the group or repeating unit is connected to another group or repeating unit.

I. Polyimide-Based Block Copolymer

According to an exemplary embodiment of the present disclosure, a polyimide-based block copolymer including a first repeating unit represented by Chemical Formula 1 and a second repeating unit represented by Chemical Formula 2 is provided.

[Chemical Formula 1]

[Chemical Formula 2]

In Chemical Formulae 1 and 2, $L^1$ and $L^2$ are the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O) NH—, or a C6 to C30 divalent aromatic organic group;

$R^1$ and $R^2$ are independently —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3;

$Ar^1$ and $Ar^2$ are the same as or different from each other in each repeating unit, and each is independently a C6 to C30 divalent aromatic organic group, wherein at least one of $Ar^1$ and $Ar^2$ includes a C6 to C30 divalent aromatic organic group substituted with at least one of an acetate group (CH$_3$COO—) and a hydroxyl group (HO—), and the divalent aromatic organic group exists alone, or two or more aromatic organic groups are bonded to each other to form a condensed ring, or two or more aromatic organic groups are linked by a single bond, —O—, —S—, —C(=O)—, —CH (OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^1$ to $E^4$ are independently a single bond, —NH—, or —C(=O)—; and each $Z^1$ is the same as or different from each other in each repeating unit, and each is independently a trivalent linking group derived from at least one compound selected from the group consisting of triacyl halide, triamine, and tricarboxylic acid.

As a result of further studies by the present inventors, it was confirmed that a polyimide-based block copolymer having a large molecular weight and a low yellow index can be formed when a brancher having three reactive substituents is introduced to a linear polyimide chain, and it is block polymerized with an imide repeating unit having at least one of an acetate group (CH$_3$COO—) and a hydroxyl group (HO—).

Particularly, as the acetate group is in a form that the hydroxyl group is protected, it is possible to form an activated hydroxyl group through hydrolysis, and these groups may enable cross-links in the copolymer.

In addition, the brancher having three reactive substituents may impart a network structure to the polyimide-based block copolymer. Further, the imide repeating unit having an acetate group (CH$_3$COO—) or a hydroxyl group (HO—) induces intra-molecular cross-links of the copolymer, thereby further strengthening the network structure and enabling the formation of a colorless and transparent copolymer.

The polyimide-based block copolymer of the present disclosure includes the first repeating unit represented by Chemical Formula 1, and the second repeating unit represented by Chemical Formula 2.

[Chemical Formula 1]

[Chemical Formula 2]

In the first repeating unit of Chemical Formula 1 and in the second repeating unit of Chemical Formula 2, $L^1$ and $L^2$ are the same as or different from each other in each repeating unit, and each is independently a single bond, —O—, —S—, —C(=O)—, —CH(OH)—, —S(=O)$_2$—, —Si (CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O) NH—, or a C6 to C30 divalent aromatic organic group.

Here, the single bond means a case that $L^1$ and/or $L^2$ are each a chemical bond which simply links the groups on both sides.

In addition, the C6 to C30 divalent aromatic organic group exists alone; two or more aromatic organic groups are bonded to each other to form a condensed ring; or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In the first repeating unit of Chemical Formula 1 and in the second repeating unit of Chemical Formula 2, $R^1$ and $R^2$ are independently —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

In the first repeating unit of Chemical Formula 1 and in the second repeating unit of Chemical Formula 2, n1 and n2 are independently 0 to 3.

In the first repeating unit of Chemical Formula 1 and in the second repeating unit of Chemical Formula 2, $Ar^1$ and $Ar^2$ are the same as or different from each other in each repeating unit, and each is independently a C6 to C30 divalent aromatic organic group.

Particularly, at least one of $Ar^1$ and $Ar^2$ includes a C6 to C30 divalent aromatic organic group substituted with at least one of an acetate group (CH$_3$COO—) and a hydroxyl group (HO—).

For example, at least one of $Ar^1$ and $Ar^2$ may include a C6 to C30 divalent aromatic organic group which is mono- or poly-substituted with an acetate group or a hydroxyl group. As another example, $Ar^1$ and $Ar^2$ may each include a C6 to C30 divalent aromatic organic group which is mono- or poly-substituted with an acetate group or a hydroxyl group.

Preferably, $Ar^2$ includes one or more C6 to C30 divalent aromatic organic groups substituted with an acetate group or a hydroxyl group.

In addition, in $Ar^1$ and $Ar^2$, the aromatic organic group exists alone; two or more aromatic organic groups are bonded to each other to form a condensed ring; or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, $Ar^1$ and $Ar^2$ are independently a group represented by Chemical Formula Ar(A) or Ar(B):

[Chemical Formula Ar(A)]

[Chemical Formula Ar(B)]

wherein, in Chemical Formulae Ar(A) and Ar(B), each $R^3$ is independently —OH, —F, —Cl, —Br, —I, —CF$_3$, —CCl$_3$, —CBr$_3$, —Cl$_3$, —NO$_2$, —CN, —COCH$_3$, CH$_3$COO—, —CO$_2$C$_2$H$_5$, a silyl group containing three C1 to C10 aliphatic organic groups, a C1 to C10 aliphatic organic group, or a C6 to C20 aromatic organic group, wherein at least one of $R^3$ included in $Ar^1$ and $Ar^2$ is an acetate group (CH$_3$COO—) or a hydroxyl group (HO—);

n3 is independently 0 to 4, wherein at least one of n3 included in $Ar^1$ and $Ar^2$ is 1 or more; and $L^3$ is a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In the first repeating unit of Chemical Formula 1 and in the second repeating unit of Chemical Formula 2, $E^1$, $E^2$, $E^3$, and $E^4$ are independently a single bond, —NH—, or —C(=O)—.

Here, the single bond means a case that $E^1$, $E^2$, $E^3$, and/or $E^4$ are each a chemical bond which simply links the groups on both sides.

In the first repeating unit of Chemical Formula 1, each $Z^1$ is a brancher having three reactive substituents, each is the same as or different from each other in each repeating unit, and each is independently a trivalent linking group derived from at least one compound selected from the group consisting of triacyl halide, triamine, and tricarboxylic acid.

Specifically, $Z^1$ may be the trivalent linking group derived from at least one compound selected from the group consisting of benzene-1,3,5-tricarbonyl trichloride, benzene-1,3,5-tricarboxylic acid, benzene-1,3,5-triamine, benzene-1,2,4-triamine, cyclohexane-1,3,5-triamine, cyclohexane-1,2,4-triamine, and pyrimidine-2,4,6-triamine.

More specifically, $Z^1$ may be at least one selected from the group represented by Chemical Formula Z1:

[Chemical Formula Z1]

Preferably, in the polyimide-based block copolymer, the first repeating unit may include a repeating unit represented by Chemical Formula A1, and the second repeating unit may include a repeating unit represented by Chemical Formula A2.

[Chemical Formula A1]

[Chemical Formula A2]

Wherein, in Chemical Formulae A1 and A2,

$R^1$ and $R^2$ are independently —F, —Cl, —Br, —I, —$CF_3$, —$CCl_3$, —$CBr_3$, —$Cl_3$, —$NO_2$, —CN, —$COCH_3$, —$CO_2C_2H_5$, a silyl group containing three C1 to C10 aliphatic organic groups, a C1 to C10 aliphatic organic group, or a C6 to C20 aromatic organic group;

n1 and n2 are independently 0 to 3; and

$Ar^1$ and $Ar^2$ are the same as or different from each other in each repeating unit, and each is independently a C6 to C30 divalent aromatic organic group, wherein at least one of $Ar^1$ and $Ar^2$ includes a C6 to C30 divalent aromatic organic group substituted with at least one of an acetate group ($CH_3COO$—) and a hydroxyl group (HO—), and the divalent aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein $1 \leq p \leq 10$), —(CF$_2$)$_q$— (wherein $1 \leq q \leq 10$), —C(CH$_3$)$_2$—, —C(CF$_3$)$_2$—, or —C(=O)NH—.

More preferably, in the polyimide-based block copolymer, the first repeating unit may include a repeating unit represented by Chemical Formula B1, and the second repeating unit may include at least one repeating unit selected from the group represented by Chemical Formulae B2, B3, and B4.

[Chemical Formula B1]

[Chemical Formula B2]    [Chemical Formula B3]

[Chemical Formula B4]

Wherein, in Chemical Formulae B1 to B4, $R^1$ and $R^2$ are independently —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3;

each $R^3$ is independently —OH, —F, —Cl, —Br, —I, —CF$_3$, —CCl$_3$, —CBr$_3$, —Cl$_3$, —NO$_2$, —ON, —COCH$_3$, CH$_3$COO—, —CO$_2$C$_2$H$_5$, a silyl group containing three C1 to C10 aliphatic organic groups, a C1 to C10 aliphatic organic group, or a C6 to C20 aromatic organic group; and $L^3$ and $L^{3'}$ are independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, the second repeating unit may mainly include a repeating unit into which a hydroxyl group is introduced as in the above Chemical Formula B2, and may include a repeating unit of the above Chemical Formula B3 or B4 in which some or all of the hydroxyl groups are protected with an acetyl group.

As a non-limiting example, in the polyimide-based block copolymer, the first repeating unit may include a repeating unit represented by Chemical Formula C1, and the second repeating unit may include at least one repeating unit selected from the group represented by Chemical Formulae C2, C3, and C4.

As described above, the $Z^1$ introduced into the first repeating unit is a brancher that imparts a network structure to the copolymer. By the block copolymerization of the repeating units containing the brancher, a network having a rigid and stable structure may be formed in the copolymer. Therefore, when the weight ratio of the first repeating unit is too low, the network structure is not sufficiently formed in the copolymer, thereby the effect of improving the physical properties may be insignificant. However, if the weight ratio of the first repeating unit is too high, gelation may occur during the polymerization.

The polyimide-based block copolymer may have a higher molecular weight than a polyimide resin having a general linear structure, due to internal cross-links and a strong and stable network structure.

Specifically, the polyimide-based block copolymer may have a weight average molecular weight of 100,000 to 5,000,000 g/mol, preferably 200,000 to 1,000,000 g/mol, more preferably 300,000 to 750,000 g/mol, and still more preferably 500,000 to 650,000 g/mol.

The polyimide-based block copolymer may be prepared by a method including the steps of:

mixing a compound forming the first repeating unit in an appropriate solvent to initiate the reaction;

adding a compound forming the second repeating unit to the reaction mixture and reacting; and adding acetic anhydride to the reaction mixture to induce a chemical imidization reaction.

[Chemical Formula C1]

[Chemical Formula C2]

[Chemical Formula C3]

[Chemical Formula C4]

Meanwhile, in the polyimide-based block copolymer, a weight ratio of the first repeating unit to the second repeating unit may be 1:1 to 3:1, preferably 1.4:1 to 2.5:1.

As a non-limiting example, the polyimide-based block copolymer may be prepared by the method including the steps of:

adding 2,2'-bis(trifluoromethyl)benzidine, 4,4'-(hexafluoroisopropylidene)diphthalic anhydride, and benzene-1,3,5-tricarbonyl trichloride to dimethylacetamide, and initiating the reaction to form a first repeating unit;

adding 2,2-bis(3-amino-4-hydroxyphenyl) hexafluoropropane or 3,3'-dihydroxybenzidine, 4,4'-(hexafluoroisopropylidene)diphthalic anhydride, and dimethylacetamide to the reaction mixture and reacting to form a block copolymer; and adding acetic anhydride to the reaction mixture to induce a chemical imidization reaction to form a polyimide-based block copolymer having the repeating units represented by Chemical Formulae 1 and 2.

According to an exemplary embodiment of the present disclosure, in the step of inducing the chemical imidization reaction, the hydroxyl group of the 2,2-bis(3-amino-4-hydroxylphenyl) hexafluoropropane may be protected with an acetyl group by acetic anhydride to form an acetate group.

The polyimide-based block copolymer may be prepared by low-temperature solution polymerization, interfacial polymerization, melt polymerization, solid phase polymerization, or the like.

II. The Polyimide-Based Film

According to another exemplary embodiment of the present disclosure, a polyimide-based film including the polyimide-based block copolymer is provided.

As described above, it was confirmed that a polyimide-based block copolymer having a large molecular weight and a low yellow index can be formed when a brancher having three reactive substituents is introduced to a linear polyimide chain, and it is block polymerized with an imide repeating unit having at least one of an acetate group ($CH_3COO-$) and a hydroxyl group ($HO-$).

Therefore, the polyimide-based film including the polyimide-based block copolymer may be used as a material for various molded articles requiring high mechanical properties together with colorless transparency. For example, the polyimide-based film may be applied as a substrate for a display, a protective film for a display, a touch panel, or the like.

The polyimide-based film may be prepared by a conventional method such as a dry method or a wet method using the polyimide-based block copolymer. For example, the polyimide-based film may be obtained by coating a solution containing the copolymer on an arbitrary support to form a film, and drying the film by evaporating the solvent from the film. If necessary, stretching and heat treatment for the polyimide-based film may be carried out.

The polyimide-based film may exhibit colorless and transparent properties, because it is prepared using the polyimide-based block copolymer.

Specifically, the polyimide-based film may have a yellow index (YI) of 2.0 or less, or 1.5 or less, or 1.45 or less, as measured in accordance with ASTM E313.

Advantageous Effects

The polyimide-based block copolymer according to the present disclosure makes it possible to provide a polyimide-based film having a large molecular weight and exhibiting colorless and transparent properties.

DETAILED DESCRIPTION OF THE EMBODIMENTS

Figure 1:
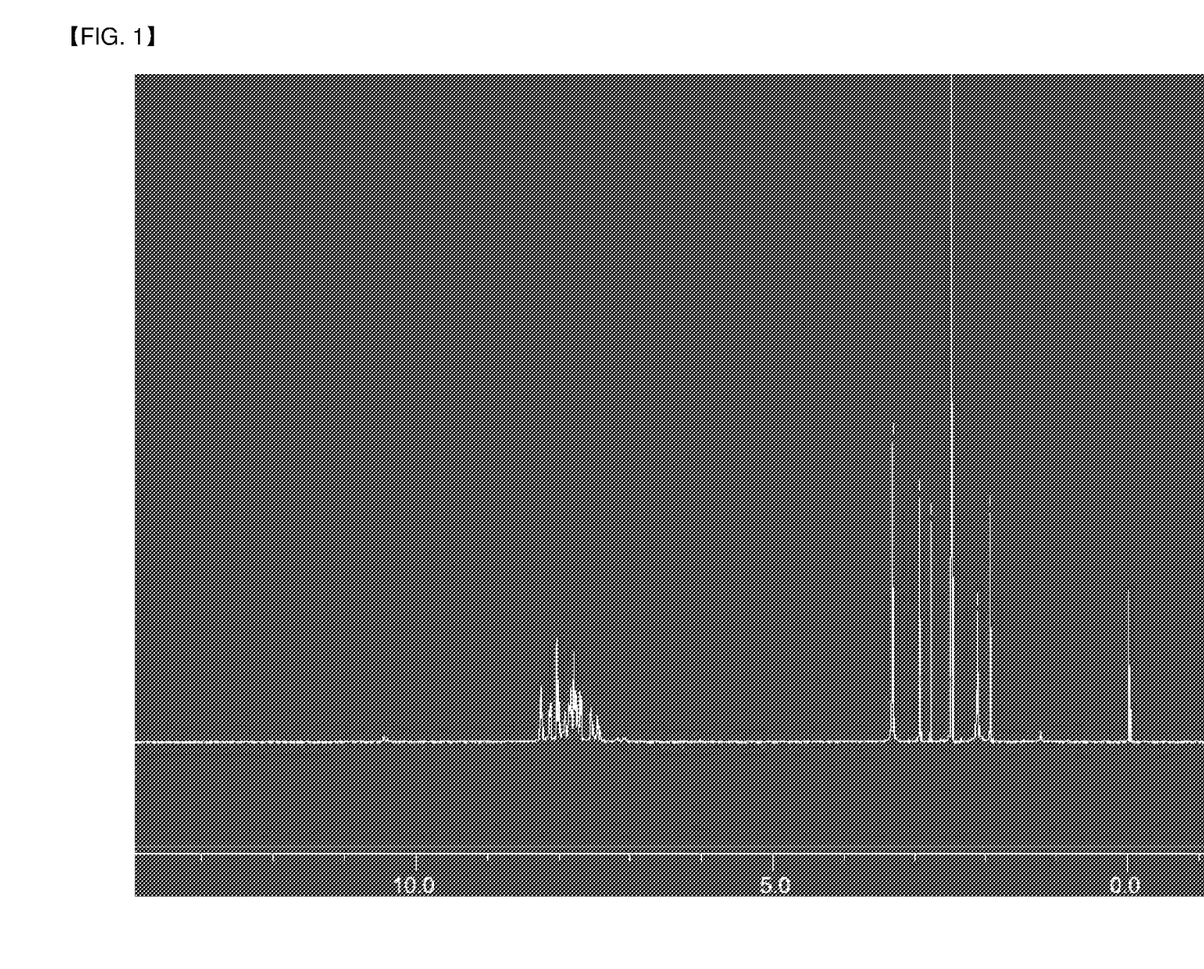
FIG. 1 is an NMR spectrum of the polyimide-based copolymer obtained in Example 1.
Figure 2:
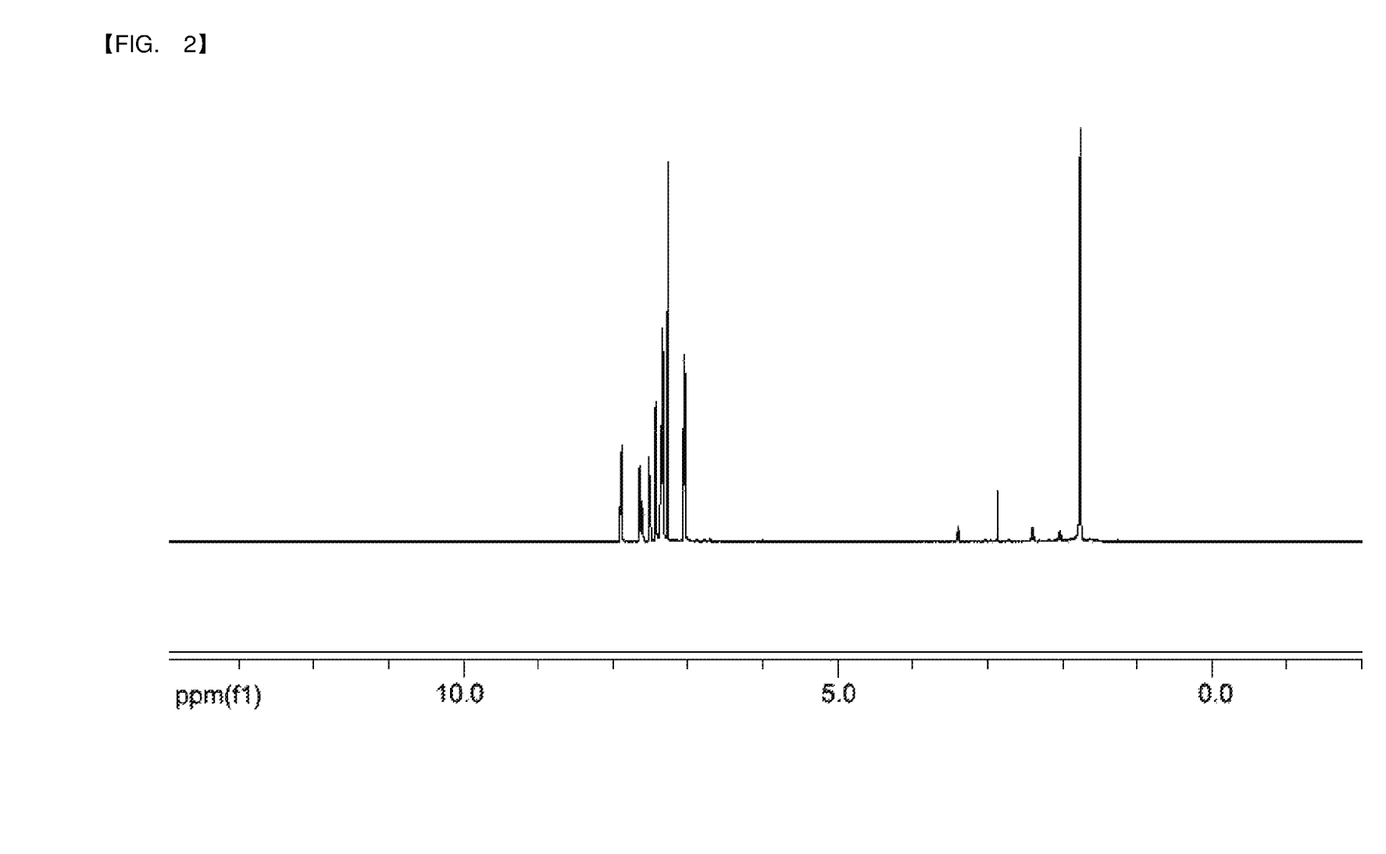
FIG. 2 is an NMR spectrum of the polyimide-based copolymer obtained in Example 3.
Figure 3:
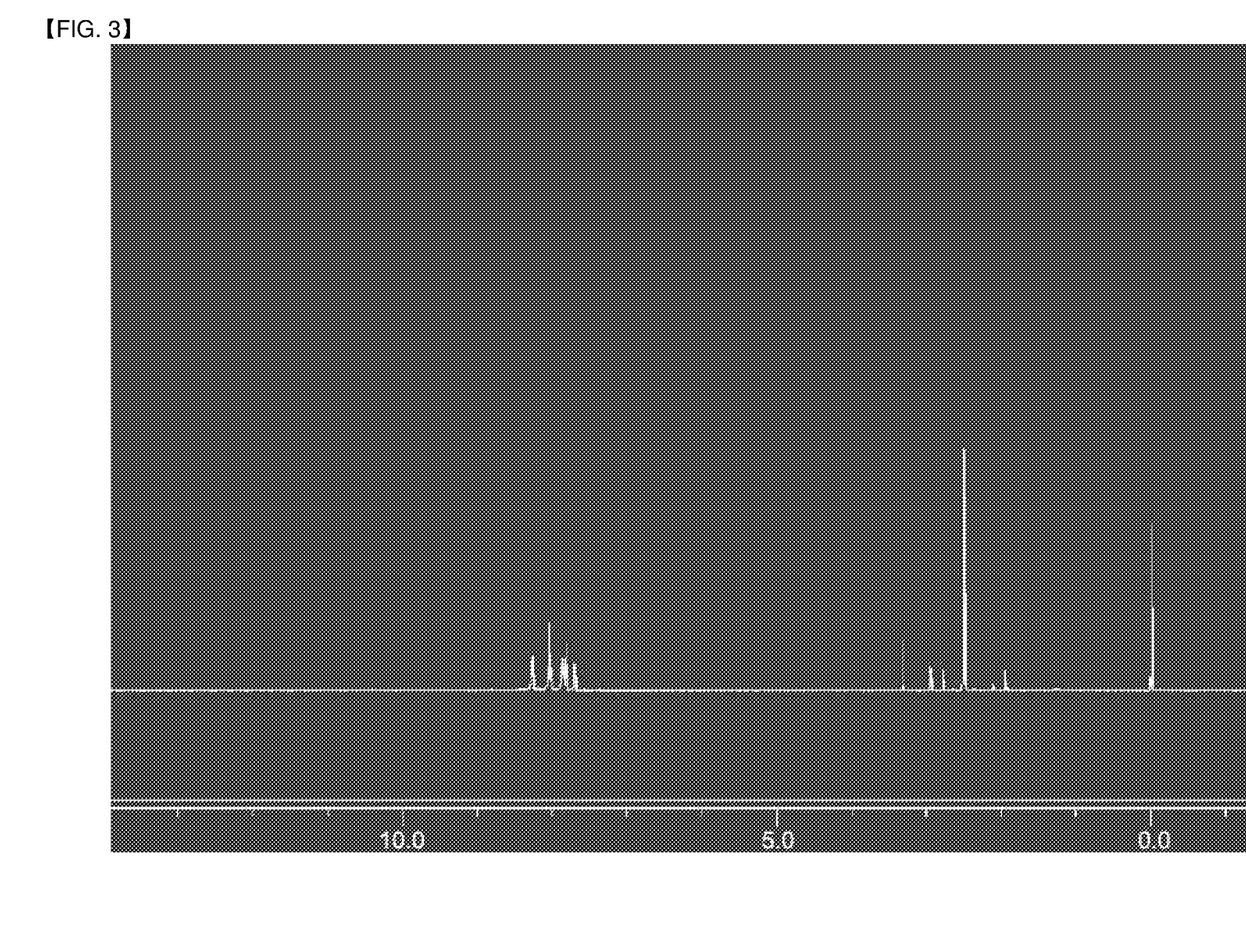
FIG. 3 is an NMR spectrum of the polyimide-based copolymer obtained in Comparative Example 2.

Hereinafter, preferred examples are provided for better understanding. However, these examples are for illustrative purposes only, and the invention is not intended to be limited by these examples.

Example 1

4.851 g (1.01 eq., 0.01515 mol) of 2,2'-bis(trifluoromethyl)benzidine; 6.5970 g (0.99 eq., 0.001485 mol) of 4,4'-(hexafluoroisopropylidene)diphthalic anhydride; 0.040 g (0.005 eq., 0.000151 mol) of benzene-1,3,5-tricarbonyl trichloride; and 58 ml of dimethylacetamide were placed in a 500 mL round flask equipped with a Dean-Stark apparatus and a condenser, and the reaction was initiated at room temperature. The reaction mixture was stirred using ice water at 0° C. for 4 hours under a nitrogen atmosphere.

After 4 hours, the reaction product was taken out and raised to room temperature, and 5.4390 g (0.99 eq., 0.01485 mol) of 2,2-bis(3-amino-4-hydroxyphenyl) hexafluoropropane, 6.7302 g (1.01 eq., 0.001515 mol) of 4,4'-(hexafluoroisopropylidene)diphthalic anhydride, and 120 ml of dimethylacetamide were added thereto, and the reaction was initiated at room temperature under a nitrogen atmosphere.

After the formation of a polyamic acid polymer by the reaction for 4 hours, 10 ml (0.099 mol) of acetic anhydride and 8 ml of pyridine (0.099 mol) were added to the reaction mixture, and the mixture was stirred in an oil bath at 40° C. for 15 hours to carry out the chemical imidization reaction.

After completion of the reaction, the reaction product was precipitated with water and ethanol to obtain a polyimide-based block copolymer having the following repeating units (weight average molecular weight: about 490,000 g/mol).

-continued

Example 2

A polyimide-based copolymer (weight average molecular weight: about 480,000 g/mol) was obtained in the same manner as in Example 1, except that the content of the benzene-1,3,5-tricarbonyl trichloride was changed to 0.0266 g (0.01 eq., 0.0001 mol).

$^1$H NMR (CDCl$_3$, TMS as standard material) δ(ppm): 10.854 (s), 8.644 (s), 8.383 (s), 8.256 (m), 8.162 (d), 8.044 (s), 8.017 (d), 7.851 (d), 7.816 (m), 7.7 (d), 7.430 (d)

Example 3

4.851 g (1.01 eq., 0.01515 mol) of 2,2'-bis(trifluoromethyl)benzidine, 6.546 g (0.9825 eq., 0.001473 mol) of 4,4'-(hexafluoroisopropylidene)diphthalic anhydride, 0.01991 g (0.005 eq. 0.000075 mol) of benzene-1,3,5-tricarbonyl trichloride, and 81 ml of dimethylacetamide were placed in a 500 mL round flask equipped with a Dean-Stark apparatus and a condenser, and the mixture was stirred at 4° C. for 4 hours.

After 4 hours, the reaction product was taken out and raised to room temperature, and 3.211 g (0.99 eq., 0.01485 mol) of 3,3'-dihydroxybenzidine, 6.7302 g (1.01 eq., 0.001515 mol) of 4,4'-(hexafluoroisopropylidene)diphthalic anhydride, and 71 ml of dimethylacetamide were added thereto, and the reaction was initiated at room temperature under a nitrogen atmosphere.

After the formation of a polyamic acid polymer by the reaction for 4 hours, 10 ml (0.099 mol) of acetic anhydride and 8 ml of pyridine (0.099 mol) were added to the reaction mixture, and the mixture was stirred in an oil bath at 40° C. for 15 hours to carry out the chemical imidization reaction.

After completion of the reaction, the reaction product was precipitated with water and ethanol to obtain a polyimide-based block copolymer having the following repeating units (weight average molecular weight: about 200,000 g/mol).

Comparative Example 1

A polyimide-based copolymer (weight average molecular weight: about 470,000 g/mol) was obtained in the same manner as in Example 1, except that the benzene-1,3,5-tricarbonyl trichloride was not used in the formation of the copolymer.

Comparative Example 2

4.851 g (1.01 eq., 0.01515 mol) of 2,2'-bis(trifluoromethyl)benzidine, 6.5970 g (0.99 eq., 0.001485 mol) of 4,4'-(hexafluoroisopropylidene)diphthalic anhydride, 0.040 g (0.005 eq., 0.000151 mol) of benzene-1,3,5-tricarbonyl trichloride, and 58 ml of dimethylacetamide were placed in a 500 mL round flask equipped with a Dean-Stark apparatus and a condenser, and the reaction was initiated at room temperature. The reaction mixture was stirred using ice water at 0° C. for 4 hours under a nitrogen atmosphere.

After the formation of a polyamic acid polymer by the reaction for 4 hours, 10 ml (0.099 mol) of acetic anhydride and 8 ml of pyridine (0.099 mol) were added to the reaction mixture, and the mixture was stirred in an oil bath at 40° C. for 15 hours to carry out the chemical imidization reaction.

The reaction product was cooled down to room temperature, and precipitated with water to obtain a polyimide-based block copolymer having the following repeating unit (weight average molecular weight: 150,000 g/mol to 300,000 g/mol).

Preparation Examples 1 to 5

A film was prepared using the polyimide-based copolymer obtained in Example 1 (Preparation Example 1). A film was prepared using the polyimide-based copolymer obtained in Example 2 (Preparation Example 2). A film was prepared using the polyimide-based copolymer obtained in Example 3 (Preparation Example 3). A film was prepared using the polyimide-based copolymer obtained in Comparative Example 1 (Preparation Example 4). A film was prepared using the polyimide-based copolymer obtained in Comparative Example 2 (Preparation Example 5).

Specifically, the polyimide-based copolymer was dissolved in dimethylacetamide to prepare a polymer solution of about 20% (w/V). The polymer solution was poured on a glass plate, the thickness of the polymer solution was uniformly controlled using a film applicator, and then dried in a vacuum oven at 120° C. for 12 hours or more to produce a polyimide-based film having a thickness of 20 to 30 μm.

Experimental Examples

A yellow index (Y.I.) of the films of the preparation examples was measured in accordance with ASTM E313 using a COH-400 Spectrophotometer (NIPPON DENSHOKU INDUSTRIES).

TABLE 1

|  | Preparation Example 1 | Preparation Example 2 | Preparation Example 3 | Preparation Example 4 | Preparation Example 5 |
|---|---|---|---|---|---|
| Y.I. | 1.21 | 1.45 | 1.25 | 1.80 | 2.22 |

Referring to the Table 1, it was confirmed that the films of Preparation Examples 1 to 3 had a lower yellow index than the films of Preparation Examples 4 and 5.

It is presumed that the block copolymers of Examples 1 to 3 maintain a hydrogen bond and a cross-link between the polymer chains well to exhibit excellent mechanical properties and a low yellow index, since they have a well-aligned structure compared with the random copolymer of Comparative Example 2.

The invention claimed is:

1. A polyimide-based block copolymer comprising
a first repeating unit represented by Chemical Formula 1, and
a second repeating unit represented by Chemical Formula 2, wherein a weight ratio of the first repeating unit to the second repeating unit is 1:1 to 3:1:

wherein, in Chemical Formulae 1 and 2, $L^1$ and $L^2$ are the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 divalent aromatic organic group;

$R^1$ and $R^2$ are independently —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3;

$Ar^1$ and $Ar^2$ are the same as or different from each other in each repeating unit, and each is independently a C6 to C30 divalent aromatic organic group, wherein at least one of $Ar^1$ and $Ar^2$ comprises a C6 to C30 divalent aromatic organic group substituted with at least one group selected from an acetate group (CH$_3$COO—) and a hydroxyl group (HO—), and the divalent aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

E$^1$ to E$^4$ are independently a single bond, —NH—, or —C(=O)—; and each Z$^1$ is the same as or different from each other in each repeating unit, and each is independently a trivalent linking group derived from at least one compound selected from the group consisting of triacyl halide, triamine, and tricarboxylic acid.

2. The polyimide-based block copolymer of claim 1, wherein Ar$^1$ and Ar$^2$ are independently a group represented by Chemical Formula Ar(A) or Ar(B):

[Chemical Formula Ar(A)]

[Chemical Formula Ar(B)]

wherein, in Chemical Formulae Ar(A) and Ar(B), each R$^3$ is independently —OH, —F, —Cl, —Br, —I, —CF$_3$, —CCl$_3$, —CBr$_3$, —CI$_3$, —NO$_2$, —CN, —COCH$_3$, CH$_3$COO—, —CO$_2$C$_2$H$_5$, a silyl group containing three C1 to C10 aliphatic organic groups, a C1 to C10 aliphatic organic group, or a C6 to C20 aromatic organic group, wherein at least one of R$^3$ included in Ar$^1$ and Ar$^2$ is an acetate group (CH$_3$COO—) or a hydroxyl group (HO—);

n3 is independently 0 to 4, wherein at least one of n3 included in Ar$^1$ and Ar$^2$ is 1 or more; and L$^3$ is a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

3. The polyimide-based block copolymer of claim 1, wherein Ar$^2$ comprises a C6 to C30 divalent aromatic organic group substituted with an acetate group or a hydroxyl group.

4. The polyimide-based block copolymer of claim 1, wherein Z$^1$ is a trivalent linking group derived from at least one compound selected from the group consisting of benzene-1,3,5-tricarbonyl trichloride, benzene-1,3,5-tricarboxylic acid, benzene-1,3,5-triamine, benzene-1,2,4-triamine, cyclohexane-1,3,5-triamine, cyclohexane-1,2,4-triamine, and pyrimidine-2,4,6-triamine.

5. The polyimide-based block copolymer of claim 1, wherein Z$^1$ is at least one selected from the group represented by Chemical Formula Z1:

[Chemical Formula Z1]

6. The polyimide-based block copolymer of claim 1, wherein the first repeating unit comprises a repeating unit represented by Chemical Formula A1, and the second repeating unit comprises a repeating unit represented by Chemical Formula A2:

[Chemical Formula A1]

[Chemical Formula A2]

wherein, in Chemical Formulae A1 and A2,

R$^1$ and R$^2$ are independently —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3; and

Ar$^1$ and Ar$^2$ are the same as or different from each other in each repeating unit, and each is independently a C6 to C30 divalent aromatic organic group, wherein at least one of Ar$^1$ and Ar$^2$ comprises a C6 to C30 divalent aromatic organic group substituted with at least one group selected from an acetate group (CH$_3$COO—) and a hydroxyl group (HO—), and the divalent aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

7. The polyimide-based block copolymer of claim 1, wherein the first repeating unit comprises a repeating unit represented by Chemical Formula B1, and the second repeating unit comprises at least one repeating unit selected from the group represented by Chemical Formulae B2, B3, and B4:

each R$^3$ is independently —OH, —F, —Cl, —Br, —I, —CF$_3$, —CCl$_3$, —CBr$_3$, —CI$_3$, —NO$_2$, —CN, —COCH$_3$, CH$_3$COO—, —CO$_2$C$_2$H$_5$, a silyl group containing three C1 to C10 aliphatic organic groups, a C1 to C10 aliphatic organic group, or a C6 to C20 aromatic organic group; and

L$^3$ and L$^3$ are independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

8. The polyimide-based block copolymer of claim 1, wherein a weight ratio of the first repeating unit to the second repeating unit is 1.4:1 to 2.5:1.

[Chemical Formula B1]

[Chemical Formula B2]

[Chemical Formula B3]

[Chemical Formula B4]

wherein, in Chemical Formulae B1 to B4,

R$^1$ and R$^2$ are independently —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3;

n3 is independently 0 to 4, wherein at least one n3 is 1 or more;

9. The polyimide-based block copolymer of claim 1, wherein a weight average molecular weight is 100,000 to 5,000,000 g/mol.

10. A polyimide-based film comprising the polyimide-based block copolymer according to claim 1.

11. The polyimide-based film of claim 10, wherein the film has a yellow index (YI) of 2.0 or less, as measured in accordance with ASTM E313.

* * * * *